UNITED STATES PATENT OFFICE.

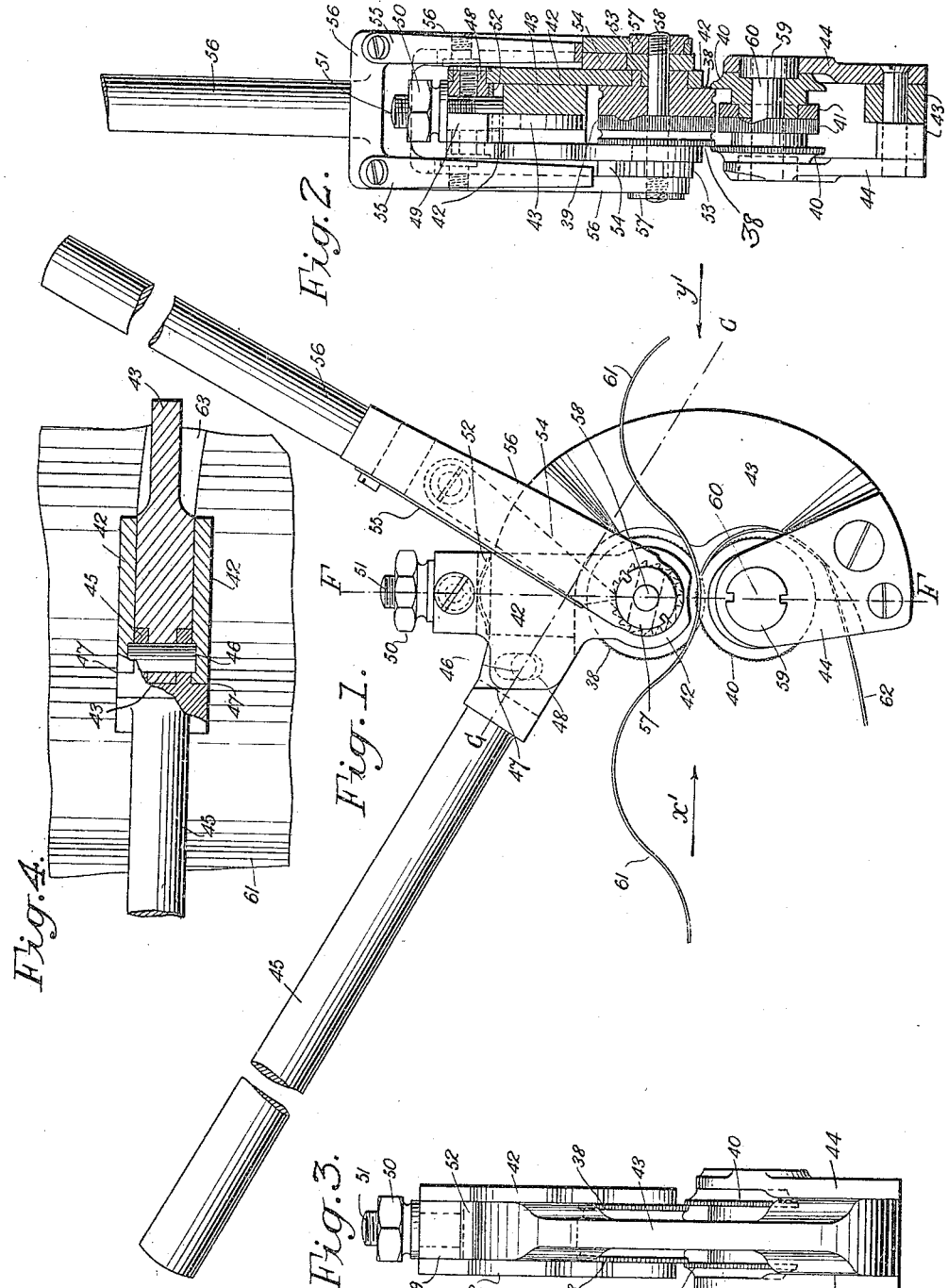

CHARLES ROBERT MONTGOMERY, OF KEYNSHAM, NEAR BRISTOL, ENGLAND.

APPLIANCE FOR SHEARING METAL.

1,229,120.  Specification of Letters Patent.  Patented June 5, 1917.

Application filed September 21, 1914. Serial No. 862,851.

*To all whom it may concern:*

Be it known that I, CHARLES ROBERT MONTGOMERY, a subject of the King of Great Britain and Ireland, residing at Keynsham, near Bristol, in the county of Somerset, England, have invented certain new and useful Improvements in Appliances for Shearing Metal; and I do hereby declare the following to be a full, clear and exact description of the invention, such as will enable others skilled in the art to which it appertains to make and use the same.

This invention relates to a metal shearing appliance or tool more especially intended for shearing corrugated sheets and has for its object to provide a portable device for hand use, whereby the shearing of such sheets may be accomplished in an efficient manner and without distortion of the cut edges and in which the operation of the tool simultaneously and automatically effects the feed or relative movement between the tool and the sheet.

To this end the invention comprises a pair of rotary shearing members (hereinafter referred to as the cutters) mounted upon a frame or member, one of which cutters is adapted to be driven while the other runs free, said cutters being formed with duplicate and parallel cutting edges, the periphery of the driven cutter being knurled or otherwise formed with teeth-like serrations, the whole operating in such manner that a strip of the sheet being operated upon is cut out and deflected to enable the tool to automatically travel in the gap or opening so obtained.

The feed strip above referred to may be gripped between the periphery of the driven cutter, or a circumferential portion thereof, and a bearing surface formed on the other cutter between the cutting edges, and for adjusting this grip or pressure upon said strip, suitable means are provided said means also serving for the purpose of releasing the cutters by moving them apart to enable the tool to be removed in the case where it is required to only partly cut across a sheet.

In order to adapt the tool to cut curves the frame or member upon which the cutters are mounted is suitably backed off or reduced in thickness toward the rear or trailing edge of said frame.

The driven cutter is preferably driven by means of a ratchet device of any suitable type operated by a handle adapted to be reciprocated by the user the tool being supported meanwhile and guided by another handle rigidly secured to the frame, said handles being held one in each hand.

In some cases the bearing surface between the cutting edges of the free cutter may be in the form of a separate ring loosely mounted thereon, knurled or not, to facilitate the relative or feeding movement between sheet and cutters.

The accompanying drawings illustrate by way of example one form of the improved tool in which:—

Figure 1 is a side elevation.

Fig. 2 is a front elevation partly in section on the line F—F of Fig. 1 as seen looking in the direction of the arrow $x^1$.

Fig. 3 is a rear view looking in the direction of the arrow $y^1$. From this figure both handles and certain other parts are omitted in order to show clearly the configuration of the frame and the guides or cheeks relatively to one another.

Fig. 4 is a detail plan partly in section on the line G—G of Fig. 1 showing the method of attachment of the holding or guide handle.

Referring to the drawings. 38 is the driven cutting member which is milled or knurled around both butting edges and between these edges additional milled surface is provided as at 39, of the same diameter as the cutting edges, serving the purpose of a driven feed roller. Between the cutting edges of the free running cutter 40 is a milled bearing roller, 41 of smaller diameter than the said cutting edges. The roller 41 is free to rotate about its axis. The driven cutting member 38 is mounted in cheeks 42 at one end of the frame 43, toward the opposite end of which are mounted the cheeks 44 carrying the free cutting member 40 and the free bearing roller 41. From the frame 43 extends the handle 45 by which the tool is held in position and guided. The handle 45 is held to the frame 43 by the pin 46 which projects into the cheeks 42 as seen more particularly in Fig. 4. Shoulders 47 are formed on the handle 45 to take the forward thrust of the cheeks 42 in the process of cutting. The cheeks are held from moving in the opposite direction by the pin 46 which passes into recesses 48 formed in the cheeks 42, said recesses being elongated to allow for adjustment of the cheeks 42.

In order to allow for different gages of metal the cheeks 42 are mounted either on bearings, or in any other convenient manner, thus I may provide an adjustment block 49 which is adjustable by means of a nut 50 and screw 51 so that the cutting member 38 can be adjusted toward or away from the cutting member 40. The block 49 is held up to the adjusting nut 50 by means of a spring 52. Such provision for adjustment may if desired be made in respect of the free cutter 40 instead of the driven cutter 38.

The driven cutter 38 engages, by clutch or other means, with ratchets 53 which are driven by pawls 54 acted upon by springs 55 carried on a ratchet handle 56 which is pivotally mounted on the spindle 58, and held thereon by means of flanged collars 57 screwed on the spindle 58, and this spindle passes through the center of and rotates with the driven cutter 38.

In order to permit the mounting of the free bearing roller 41, the free cutter 40 is made in two halves, which are secured together by means of collars 59 screwed on a spindle 60, as seen more particularly in Fig. 2.

In Fig. 1 a piece of corrugated sheet 61 is shown in the process of being cut; and the feed strip 62 is seen after passing out between and below the cutting edges of the free cutter 40, thus leaving a clearness or gap 63 (see Fig. 4) for the passage of the tool.

The diameter of the bearing roller 41 relative to the diameter of the cutting edges should be such that when the thickest gage of metal that the tool is adapted for, is being cut, the cutting edges of the upper and lower cutters should overlap as little as possible. The capacity for adjustment by means of the nut 50 should be such that the cutter 38 may be capable of further separation from the cutter 40 to allow for withdrawing the tool, and, in the opposite direction, to approach the cutter 40 until the feed roller 39 and the bearing roller 41 are in contact with one another.

In operation, the tool should be held firmly against the edge of the sheet, preferably the right hand edge, with the handle 45 pointing in the direction of the cutting line; as the driven cutter 38 is rotated by the ratchet handle 56 which is held by the right hand, the tool commences to cut and traverse at the same time being guided by the left hand. The feed strip 62 is deflected downward by the upper cutter 38 and thereafter is forced to follow the contour of the inside edge of the frame 43 until it emerges below the lower cutter 40 as seen in Fig. 1.

In the operation of cutting, the natural inclination of the tool is such that a line joining the axes of the two cutters 38 and 40, such as the line F—F Fig. 1, is perpendicular to the plane of the sheet at the actual point of cutting: consequently when cutting at right angles to the corrugations, the tool should be allowed to incline backward as it rides up the corrugations and forward as it rides down the same. It follows when cutting at an angle to the corrugations, other than at a right angle, the tool will also require to lean alternately to one side and the other in addition to being inclined forward and backward as already described.

In order to allow for the varying inclinations of the tool, as above described, and to allow for the clearance for the back edge of the frame 43 when cutting on a curve, the thickness of the center portion of the frame 43, as represented by the portion between the shade lines in Fig. 1, is made approximately only half the width of the clearance 63—Fig. 4—which is created by the diversion of the feed strip 62 as already described. The minimum radius of curve which the tool is capable of cutting, is to a considerable extent dependent upon the amount of clearance between the back of the frame 43 and the cut edges of the sheet 61 in the clearance 63 as explained above. In Fig. 4 the clearance 63 is shown as cut on a curve and it will be seen that one corner of the frame 43 is abutting against the cut edges of the sheet. This portion of the frame 43 may be tapered at the back edges to allow more latitude where required.

Having thus described my invention, what I claim and desire to secure by Letters Patent of the United States is:—

1. An appliance for shearing corrugated or other formed sheets comprising a frame, means for holding said frame, a driven rotary cutter and a co-acting free rotary cutter mounted on said frame, each of said cutters having a plurality of parallel cutting edges spaced apart and said driven cutter being provided with a knurled or dented portion between its cutting edges adapted to be impressed into the metal being operated upon, means whereby the metal between the edges of said free cutter is supported, and means carried by the frame whereby the strip of metal so sheared is deflected in advance of the frame to allow the free passage of the tool, substantially as described.

2. An appliance for shearing corrugated or other formed sheets comprising a frame, means for holding said frame, a driven rotary cutter and a co-acting free rotary cutter mounted on said frame, each of said cutters having two annular parallel cutting edges spaced apart, and said driven cutter being provided with a knurled or dented portion between its cutting edges adapted to be impressed into the metal being operated upon, the said free cutter being provided with knurled or dented portions around its periphery, and means carried by the frame whereby the strip of metal so sheared is deflected in advance of the frame to allow the free passage of the tool, substantially as described.

3. An appliance for shearing corrugated or other formed sheets comprising a frame, means for holding said frame, a driven rotary cutter and a co-acting free rotary cutter mounted on said frame, each of said cutters having a pair of annular parallel cutting edges spaced apart, and said driven cutter being provided with a knurled or dentated surface between its cutting edges adapted to be impressed into the metal being operated upon, a freely mounted bearing ring disposed between the edges of said free cutter, and means carried by the frame whereby the strip of metal so sheared is deflected in advance of the frame to allow the free passage of the tool, substantially as described.

4. An appliance for shearing corrugated or other formed sheets comprising a frame, means for holding and guiding said frame, a driven rotary cutter and a co-acting free rotary cutter mounted on said frame, each of said cutters having a pair of annular parallel cutting edges spaced apart, and said driven cutter being provided with a knurled or dentated surface between the cutting edges adapted to be impressed into the metal being operated upon, a pivoted handle, and means controlled thereby for intermittently rotating said driven cutter in one direction, means whereby the metal lying between the edges of said free cutter is supported, and means carried by the frame whereby the strip of metal so sheared is deflected in advance of the frame to allow free passage of the tool, substantially as described.

5. An appliance for shearing corrugated or other formed sheets comprising a frame reduced in thickness toward the rear or trailing edge, means for holding said frame, a driven rotary cutter and a co-acting free rotary cutter mounted on said frame, each of said cutters having a pair of annular parallel cutting edges spaced apart, and said driven cutter being provided with a knurled or dentated portion between the cutting edges adapted to be impressed into the metal being operated upon, means whereby the metal lying between the cutting edges of said free cutter is supported, and means carried by the frame whereby the strip of metal so sheared is deflected in advance of the frame to allow the free passage of the tool, substantially as described.

6. An appliance for shearing corrugated or other formed sheets comprising a frame, means for holding said frame, a driven rotary cutter and a co-acting free rotary cutter mounted on said frame, each of said cutters having a pair of annular parallel cutting edges spaced apart, and said driven cutter being provided with a knurled or dentated portion between the cutting edges adapted to be impressed into the metal being operated upon, means whereby the metal lying between the edges of said free cutter is supported, means carried by the frame whereby the strip of metal so sheared is deflected in advance of the frame to allow the free passage of the tool, and means for adjusting the cutters relatively to each other, substantially as described.

7. An appliance for shearing corrugated or other formed sheets comprising a frame, means for holding said frame, a driven rotary cutter and a co-acting free rotary cutter mounted on said frame, each of said cutters having a pair of annular parallel cutting edges, spaced apart, and said driven cutter being provided with a knurled or dentated portion between the cutting edges adapted to be impressed into the metal being operated upon, means whereby the metal lying between the edges of said free cutter is supported, means carried by the frame whereby the strip of metal so sheared is deflected in advance of the frame to allow the free passage of the tool, and means for adjusting the cutters relatively to each other comprising a pair of cheeks in which said driven cutter is journaled, means for guiding said cheeks, and a screw for moving said cheeks, substantially as described.

In testimony whereof, I affix my signature, in presence of two witnesses.

CHARLES ROBERT MONTGOMERY.

Witnesses:
 E. M. SMITH,
 NICHOLAS WATTS.

Copies of this patent may be obtained for five cents each, by addressing the "Commissioner of Patents, Washington, D. C."